(12) United States Patent
Yamada et al.

(10) Patent No.: US 10,348,061 B2
(45) Date of Patent: Jul. 9, 2019

(54) SPARK PLUG

(71) Applicant: NGK SPARK PLUG CO., LTD., Nagoya-shi, Aichi (JP)

(72) Inventors: Hideto Yamada, Komaki (JP); Haruki Yoshida, Tajimi (JP); Kuniharu Tanaka, Komaki (JP); Michitaka Yamada, Tajimi (JP); Yusuke Nomura, Aichi (JP)

(73) Assignee: NGK SPARK PLUG CO., LTD., Nagoya-shi (JP)

( * ) Notice: Subject to any disclaimer, the term of this patent is extended or adjusted under 35 U.S.C. 154(b) by 0 days.

(21) Appl. No.: 16/018,949

(22) Filed: Jun. 26, 2018

(65) Prior Publication Data

US 2018/0375299 A1    Dec. 27, 2018

(30) Foreign Application Priority Data

Jun. 27, 2017  (JP) ................. 2017-125612

(51) Int. Cl.
| | |
|---|---|
| *H01T 13/38* | (2006.01) |
| *H01T 13/60* | (2011.01) |
| *B82Y 30/00* | (2011.01) |
| *C04B 35/64* | (2006.01) |
| *C04B 35/111* | (2006.01) |

(Continued)

(52) U.S. Cl.
CPC ............. *H01T 13/38* (2013.01); *B82Y 30/00* (2013.01); *C04B 35/111* (2013.01); *C04B 35/117* (2013.01); *C04B 35/62695* (2013.01); *C04B 35/64* (2013.01); *H01T 13/60* (2013.01); *C04B 2235/3206* (2013.01); *C04B 2235/3208* (2013.01); *C04B 2235/3215* (2013.01); *C04B 2235/3217* (2013.01); *C04B 2235/3224* (2013.01); *C04B 2235/3227* (2013.01); *C04B 2235/3418* (2013.01); *C04B 2235/528* (2013.01); *C04B 2235/5436* (2013.01); *C04B 2235/5445* (2013.01); *C04B 2235/6022* (2013.01); *C04B 2235/785* (2013.01); *C04B 2235/80* (2013.01); *C04B 2235/85* (2013.01);

(Continued)

(58) Field of Classification Search
USPC .................................... 123/169 EL
See application file for complete search history.

(56) References Cited

U.S. PATENT DOCUMENTS

| | | | | |
|---|---|---|---|---|
| 5,702,998 | A * | 12/1997 | Sugimoto | ............. C04B 35/597 |
| | | | | 501/97.2 |
| 2003/0122462 | A1 * | 7/2003 | Nishikawa | ............. H01T 13/38 |
| | | | | 313/143 |

(Continued)

FOREIGN PATENT DOCUMENTS

WO    WO 2013/128525 A1    9/2013

*Primary Examiner* — Ashok Patel
(74) *Attorney, Agent, or Firm* — Kusner & Jaffe (57) ABSTRACT

The spark plug includes an insulator formed of an alumina-based sintered body, and the insulator contains Si, Ba, and a rare earth element. In an analysis of the insulator by using a scanning transmission electron microscope having an electron-probe diameter of 1 nm, Si and a rare earth element are detected at a crystal grain boundary having a thickness of 15 nm or less, a content of an alkaline earth metal is less than a detection limit at the crystal grain boundary, and a diffraction spot is present in an electron diffraction pattern of a portion where Ba is detected.

8 Claims, 6 Drawing Sheets

(51) Int. Cl.
*C04B 35/117* (2006.01)
*C04B 35/626* (2006.01)

(52) U.S. Cl.
CPC .... *C04B 2235/96* (2013.01); *C04B 2235/963* (2013.01)

(56) References Cited

U.S. PATENT DOCUMENTS

| | | | |
|---|---|---|---|
| 2010/0136867 A1* | 6/2010 | Kurono | C04B 35/111 445/7 |
| 2015/0047880 A1 | 2/2015 | Takaoka et al. | |
| 2015/0207300 A1* | 7/2015 | Takeuchi | C04B 35/111 501/135 |
| 2017/0093134 A1* | 3/2017 | Yokoyama | H01T 13/38 |
| 2018/0374601 A1* | 12/2018 | Yoshida | H01B 3/12 |

\* cited by examiner

SPARK PLUG

RELATED APPLICATIONS

This application claims the benefit of Japanese Patent Application No. 2017-125612, filed Jun. 27, 2017, the entire content of which is incorporated herein by reference.

FIELD OF THE INVENTION

The present invention relates to a spark plug, particularly to a spark plug having an insulator that improves dielectric strength.

BACKGROUND OF THE INVENTION

Spark plugs used in internal-combustion engines include an insulator formed of, for example, an alumina-based sintered body containing alumina as a main component. The alumina-based sintered body is typically formed by sintering a powder mixture including a sintering additive including, for example, $SiO_2$ (e.g., International Publication No. 2013/128525). The technique disclosed in International Publication No. 2013/128525 improves dielectric strength in a high-temperature environment by controlling the grain size of a crystal phase.

Regarding the above-mentioned technique, there has been a demand for further improvement in terms of the dielectric strength in a high-temperature environment.

The present invention is made to meet the foregoing demand. An advantage of the present invention is a spark plug having an insulator that improves dielectric strength in a high-temperature environment.

SUMMARY OF THE INVENTION

In accordance with a first aspect of the present invention, there is provided a spark plug having an insulator formed of an alumina-based sintered body, and the insulator contains Si, Ba, and a rare earth element. In analyzing the insulator by using a scanning transmission electron microscope having an electron-probe diameter of 1 nm, Si and the rare earth element are detected at a crystal grain boundary having a thickness of 15 nm or less, and a content of an alkaline earth metal is less than a detection limit at the crystal grain boundary. Furthermore, a diffraction spot is present in an electron diffraction pattern of a portion where Ba is detected.

In the spark plug according to the first aspect of the present invention, Si and a rare earth element are detected at a crystal grain boundary having a thickness of 15 nm or less of the insulator, and the content of an alkaline earth metal, such as Mg, Ca, or Ba, is less than the detection limit at the crystal grain boundary. Thus, embrittlement of the crystal grain boundary is suppressed in a high-temperature environment. Furthermore, a portion where Ba is detected is crystalized in the insulator, and thus, embrittlement of the portion where Ba is detected is suppressed in a high-temperature environment. This improves dielectric strength in a high-temperature environment.

In accordance to a second aspect of the present invention, there is provided a spark plug as described above, wherein the insulator has an average grain size of 0.3 to 1.0 μm, thereby improving mechanical strength in addition to the advantageous effect in the first aspect.

In accordance to a third aspect of the present invention, there is provided a spark plug as described above, wherein, in an X-ray diffraction pattern specified by diffraction angle and relative intensity, the insulator has a ratio (I/II) of a peak intensity (I) of $BaAl_2Si_2O_8$ to a peak intensity (II) of $BaAl_2O_{19}$ of 0.5 or more. As a result, the rate of a crystal phase that contains Ba and Si and that has high adherence to $Al_2O_3$ is increased more than that of a crystal phase that contains Ba and no Si. Thus, the interface of the crystal phase is unlikely to be destroyed, thereby improving dielectric strength in addition to advantageous effects in the first and second aspects.

In accordance with a fourth aspect of the present invention, there is provided a spark plug as described above, wherein an insulator has a surface having an arithmetic average roughness of 1 μm or less. Thus, unevenness of the surface is unlikely to be an origin of fracture of the insulator. This ensures the mechanical strength of the insulator in addition to any one of the advantageous effects in the first to third aspects.

DETAILED DESCRIPTION OF THE INVENTION

Figure 1:
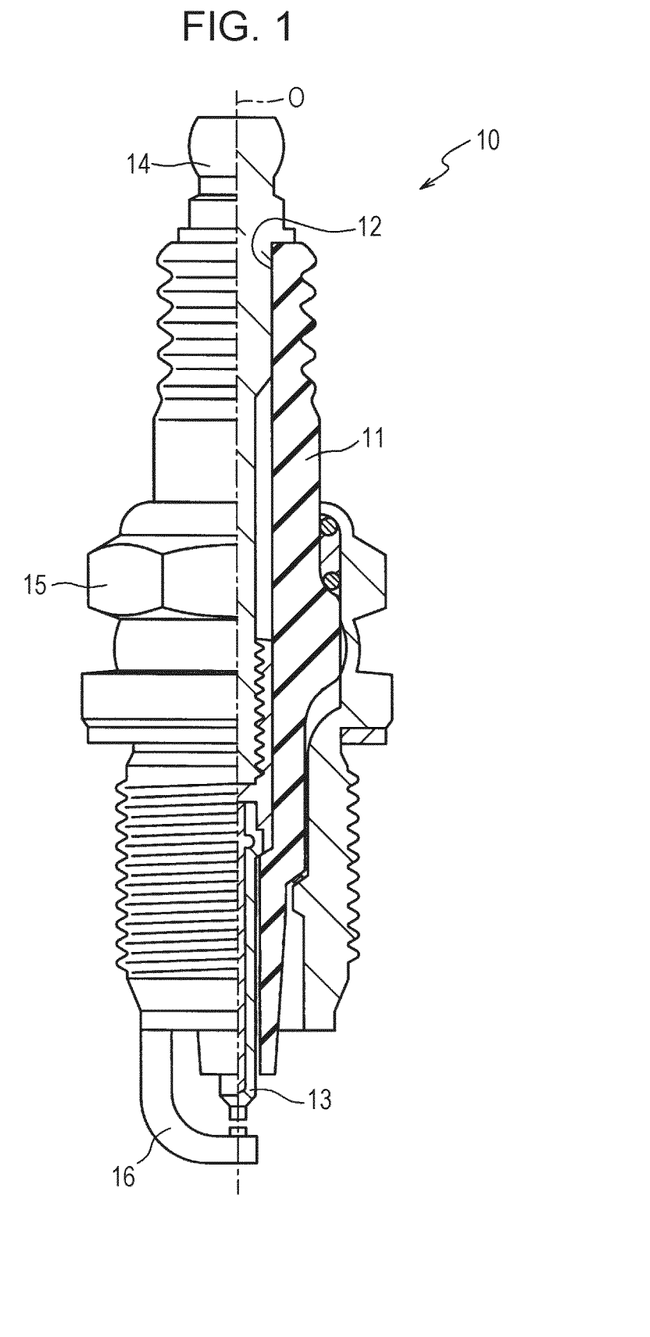
FIG. 1 is a half-sectional view of a spark plug according to an embodiment of the present invention.

Hereinafter, a preferred embodiment of the present invention will be described with reference to the attached drawings. FIG. 1 is a half-sectional view of a spark plug 10 divided along an axis O in an embodiment of the present invention. In FIG. 1, the lower portion of the spark plug 10 is referred to as the front portion thereof, and the upper portion of the spark plug 10 is referred to as the rear portion thereof. As illustrated in FIG. 1, the spark plug 10 includes an insulator 11, a center electrode 13, a metal shell 15, and a ground electrode 16.

The insulator 11 is a substantially cylindrical member formed of an alumina-based sintered body having excellent insulating properties in a high-temperature environment and excellent mechanical properties. The insulator 11 has an axial hole 12 extending therethrough along the axis O. The center electrode 13 is a rod-like electrode made of a metal (e.g., nickel-based alloy) and is inserted into the axial hole 12 and held at the front portion of the insulator 11.

A metal terminal 14 is a rod-like member connected to a high-voltage cable (not shown) and formed of an electro-conductive metal material (e.g., low-carbon steel). The metal terminal 14 is attached to the insulator 11. The front portion of the metal terminal 14 is disposed in the axial hole 12. The metal terminal 14 is electrically connected to the center electrode 13 in the axial hole 12.

The metal shell 15 is a substantially cylindrical member fixed in a threaded hole (not shown) of an internal-combustion engine and is formed of an electroconductive metal material (e.g., low-carbon steel). The ground electrode 16 is a rod-like member connected to the metal shell 15 and is formed of a metal (e.g., nickel-based alloy). The ground electrode 16 faces the center electrode 13 with a spark gap therebetween.

Figure 2:
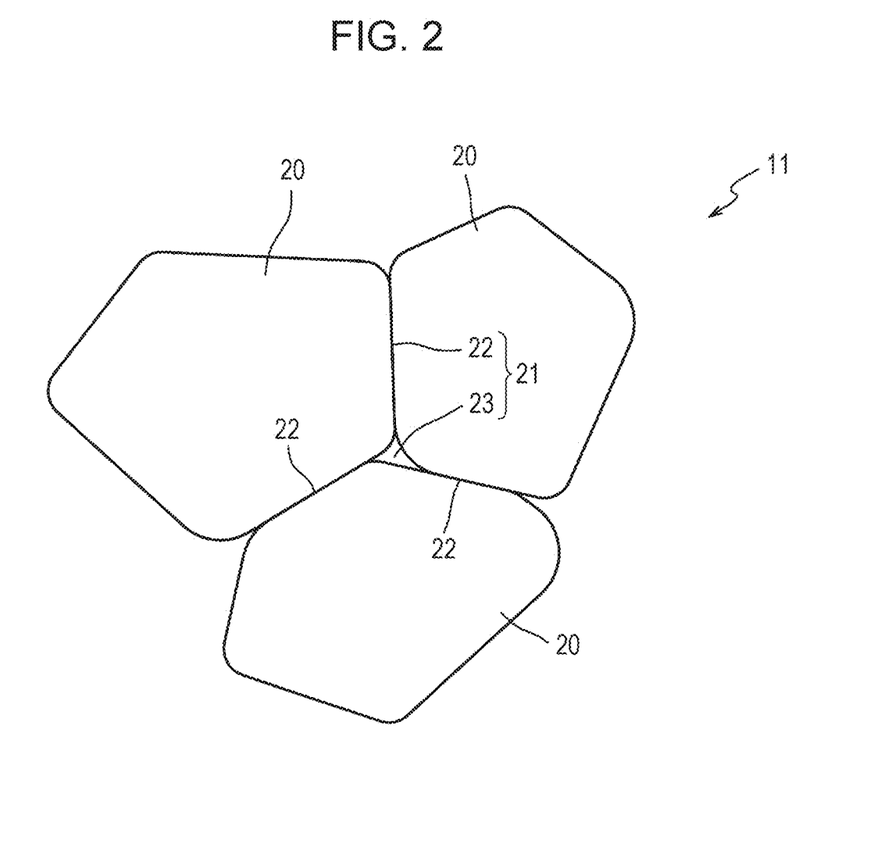
FIG. 2 is a schematic illustration of a microstructure of an insulator.

FIG. 2 is a schematic illustration of the microstructure of the insulator 11. FIG. 2 illustrates an enlarged view of a small part of the microstructure of the insulator 11. The insulator 11 formed of the alumina-based sintered body includes crystal grains 20 including alumina ($Al_2O_3$) as a main component and crystal grain boundaries 21, which are boundaries between the crystal grains 20. The crystal grain boundaries 21 include bi-grain boundaries 22, which are boundaries between two crystal grains 20, and multi-grain boundaries 23, which are boundaries between three or more crystal grains 20.

The alumina-based sintered body included in the insulator 11 contains Al, Si, Ba, and a rare earth element. The alumina-based sintered body includes an Al component in an amount of 90 to 98 wt %, as expressed in terms of $Al_2O_3$. This ensures sinterability and achieves good dielectric strength. The Al component forms a crystal phase, such as $Al_2O_3$, $BaAl_2O_{19}$, or $BaAl_2Si_2O_8$, and is present in the crystal grains 20 and at the crystal grain boundaries 21.

A Si component originates from a sintering additive and is present in the alumina-based sintered body in the form of, for example, an oxide or an ion. The Si component typically melts and forms a liquid phase in sintering and functions as a sintering additive to promote densification of the sintered body. After sintering, the Si component forms a crystal phase, such as $BaAl_2Si_2O_8$, and is present in the crystal grains 20. The Si component also forms a part of a glass skeleton and is present at the crystal grain boundaries 21. The alumina-based sintered body includes the Si component in an amount of 1 to 5 wt % and preferably 1 to 2.7 wt %, as expressed in terms of $SiO_2$. This promotes densification of the sintered body and also suppresses excessive formation of a low-melting-point glass phase at the crystal grain boundaries 21. In addition, the Si component forms, with the Al component and a Ba component, $BaAl_2Si_2O_8$, which has high adherence to $Al_2O_3$, and improves dielectric strength characteristics and mechanical properties.

The Ba component originates from a sintering additive and is present in the alumina-based sintered body in the form of, for example, an oxide or an ion. The Ba component typically melts and forms a liquid phase in sintering and functions as a sintering additive to promote densification of the sintered body. After sintering, the Ba component forms a crystal phase, such as $BaAl_2O_{19}$ or $BaAl_2Si_2O_8$, and is present in the crystal grains 20 and at the crystal grain boundaries 21.

The alumina-based sintered body includes the Ba component in an amount of 0.3 to 6 wt % and preferably 1 to 6 wt %, as expressed in terms of BaO. This promotes densification of the sintered body and also suppresses excessive formation of a low-melting-point glass phase at the crystal grain boundaries 21. Furthermore, the Ba component forms a crystal phase with Si, such as $BaAl_2Si_2O_8$, which is likely to form a low-melting-point glass, thereby suppressing the formation of a glass phase containing Si and improving dielectric strength characteristics and mechanical strength.

The alumina-based sintered body may contain an alkaline earth metal other than Ba, such as Mg or Ca. Like the Ba component, a Mg component and a Ca component function as sintering additives. After sintering, the Mg and Ca components are each present in the form of, for example, an oxide or an ion in the crystal grains 20 and at the crystal grain boundaries 21. The alumina-based sintered body includes the Mg component in an amount of 0.1 to 1 wt %, as expressed in terms of MgO. The alumina-based sintered body includes the Ca component in an amount of 2 wt % or less and preferably 0.3 wt % or less, as expressed in terms of CaO. This promotes densification of the sintered body and also suppresses excessive formation of a low-melting-point glass phase at the crystal grain boundaries 21.

Rare earth components such as Sc, Y, La, Ce, Pr, Nd, Pm, Sm, Eu, Gd, Tb, Dy, Ho, Er, Tm, Yb, and Lu originate from a sintering additive. Each rare earth component is present in the form of, for example, an oxide or an ion in the crystal grains 20 and at the crystal grain boundaries 21. The rare earth components suppress abnormal grain growth of alumina, which may otherwise occur in sintering, and ensure the mechanical strength of the insulator. The rare earth components such as those including Y, La, Pr, Nd, and Yb are easy to handle and thus preferable. The alumina-based sintered body includes the rare earth components in an amount of 0.11 to 5 wt %, as expressed in terms of oxides thereof. This suppresses abnormal grain growth of alumina in sintering and also suppresses excessive formation of a low-melting-point glass phase at the crystal grain boundaries 21.

The alumina-based sintered body may contain other elements, such as inevitable impurities, in an amount within such a range that the elements do not impair an object of the present invention. Examples of such other elements include Na, S, N, B, Ti, Mn, and Ni. When the alumina-based sintered body includes the Na component, the content is preferably 100 to 2000 ppm, as expressed in terms of $Na_2O$. This enables densification of the alumina-based sintered body and is for suppressing deposition of Na at the grain boundaries to ensure dielectric strength in a high-temperature environment.

Next, a method for producing the insulator 11 and the spark plug 10 will specifically be described. Material powder of the insulator 11, which includes an Al compound powder as a main component, a Si compound powder, a Ba compound powder, and a rare earth compound powder, is mixed with a binder and a solvent to prepare a slurry. If necessary, an additive, such as a plasticizer, an antifoamer, or a dispersant, may be added. The material powder is preferably mixed for 8 hours or longer to make the mixing state of the material powder uniform and to promote high densification of the sintered body.

The Al compound powder is not particularly limited, provided that the compound is converted to alumina in firing, and an alumina powder is typically used. The Al compound powder may include a Na component as an inevitable impurity. Thus, an Al compound powder with high purity is preferably used. For example, the purity of an Al compound powder is preferably 99.5% or more.

An Al compound powder having an average particle size of 0.1 to 5.0 μm is typically desirable to obtain a dense alumina-based sintered body. The average particle size is measured by laser diffractometry (e.g., with a Microtrack particle size distribution measuring apparatus (MT-3000), manufactured by Nikkiso Co., Ltd).

The Al compound powder is preferably prepared to be 90 mass % or more and 98 mass % or less, as expressed in terms of an oxide thereof, to obtain good dielectric strength when the mass of the alumina-based sintered body (as expressed in terms of an oxide thereof) after firing is assumed to be 100 mass %.

The Si compound powder, the alkaline earth metal compound powder, such as a Ba powder, and the rare earth compound powder are not particularly limited, provided that each compound is converted to the corresponding oxide in firing. Examples of such powders include powders of various inorganic compounds, such as oxides and complex oxides thereof, hydroxides, carbonates, chlorides, sulfates, and nitrates of the elements, and natural mineral powders. When powder other than oxide powder is used, for example, as the Si compound powder, the amount used is expressed as mass %, as expressed in terms of an oxide thereof. The purity and average particle size of the powder, such as the Si compound powder, are substantially the same as those of the Al compound powder.

The binder is required only to improve the formability of the material powder and may be a hydrophilic binder. Examples of such a hydrophilic binder include polyvinyl alcohol, water-soluble acrylic resins, gum arabic, and dextrin. These binders may be used alone or in a combination of two or more.

The binder preferably includes a lower amount of the Na component and the K component so as not to inhibit crystallization. The binder is preferably mixed 0.1 to 7 parts by mass and particularly preferably 1 to 5 parts by mass relative to 100 parts by mass of the material powder.

The solvent is required only to disperse the material powder. Examples of such a solvent include water and alcohols. These solvents are used alone or in a combination of two or more. The solvent is preferably 40 to 120 parts by mass and particularly preferably 50 to 100 parts by mass relative to 100 parts by mass of the material powder.

The slurry obtained by mixing the material powder, the binder, the solvent, and the like is dried by, for example, spray drying to be prepared as spheroidal granules. The granules preferably have an average particle size of 30 to 200 μm and particularly preferably 50 to 150 μm. This average particle size is measured by laser diffractometry (e.g., with a Microtrack particle size distribution measuring apparatus (MT-3000), manufactured by Nikkiso Co., Ltd).

Next, the granules are press-formed with, for example, a rubber press or a metal mold press to obtain a molded body. The obtained molded body is shaped by grinding the outer face thereof with, for example, a resinoid wheel. The method for molding the molded body is not limited to press forming, and other methods, such as injection molding, may be used as a matter of course.

The molded body shaped to a desired shape is heated to a maximum temperature of 1450° C. or higher within 4 hours in an air atmosphere, fired at the maximum temperature for 1 to 1.5 hours, and cooled to obtain an alumina-based sintered body. Abnormal grain growth of alumina is suppressed to ensure the dielectric strength and mechanical strength of the alumina-based sintered body (insulator 11) to be obtained.

An electrode material, such as a Ni-based alloy, is processed to a predetermined shape and size to form the center electrode 13 and the ground electrode 16. The ground electrode 16 is joined by, for example, resistance welding to the metal shell 15 formed to have a predetermined shape and size by, for example, plastic forming. The center electrode 13 and the metal terminal 14 are attached to the insulator 11 by a known method. The insulator 11 is attached to the metal shell 15 to which the ground electrode 16 is joined. The tip portion of the ground electrode 16 is folded over the center electrode 13 such that the tip of the ground electrode 16 faces the tip of the center electrode 13 and thus, the spark plug 10 is produced.

The insulator 11 includes the Si component in an amount of 1 to 5 wt %, the Mg component in an amount of 0.1 to 1 wt %, the Ca component in an amount of 2 wt % or less, the Ba component in an amount of 0.3 to 6 wt %, and the rare earth components in an amount of 0.11 to 5 wt % or less, as expressed in terms of oxides thereof. This appropriately forms a low-melting-point glass phase in firing, thereby densifying the alumina-based sintered body. Quantitative elemental analysis may be performed by ICP atomic emission spectrometry or ICP mass spectroscopy.

Figure 3A:
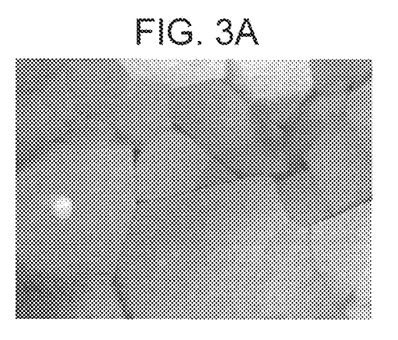
FIG. 3A is a STEM image of the insulator.
Figure 3B:
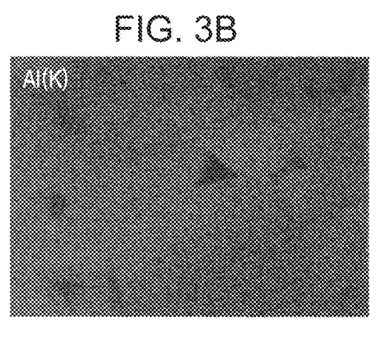
FIG. 3B shows Al distribution, obtained by using a STEM-EDS.
Figure 3C:
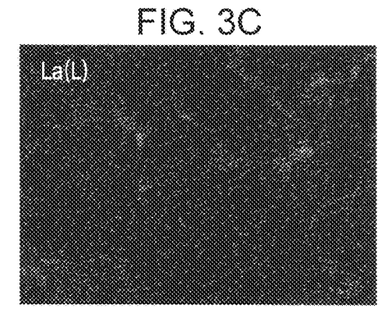
FIG. 3C shows La distribution.
Figure 3D:
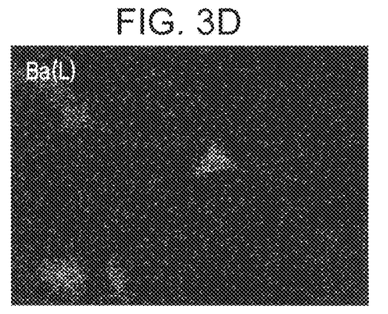
FIG. 3D shows Ba distribution.
Figure 3E:
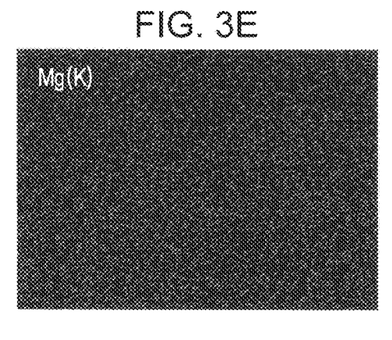
FIG. 3E shows Mg distribution.
Figure 3F:
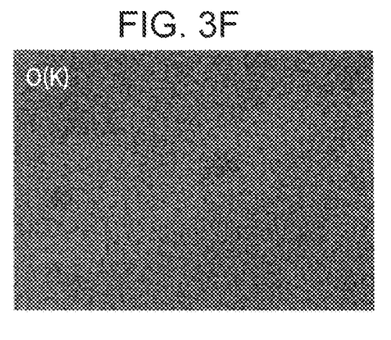
FIG. 3F shows oxygen distribution.

Next, with reference to FIGS. 3A to 5F, the result of analyzing the insulator 11 by using a scanning transmission electron microscope equipped with an energy dispersive X-ray spectrometry apparatus (STEM-EDS) will be described. FIG. 3A is a STEM image of the insulator 11. FIG. 3B shows Al distribution, obtained by using a STEM-EDS. FIG. 3C shows Ladistribution. FIG. 3D shows Ba distribution. FIG. 3E shows Mg distribution. FIG. 3F shows oxygen distribution.

Figure 4:
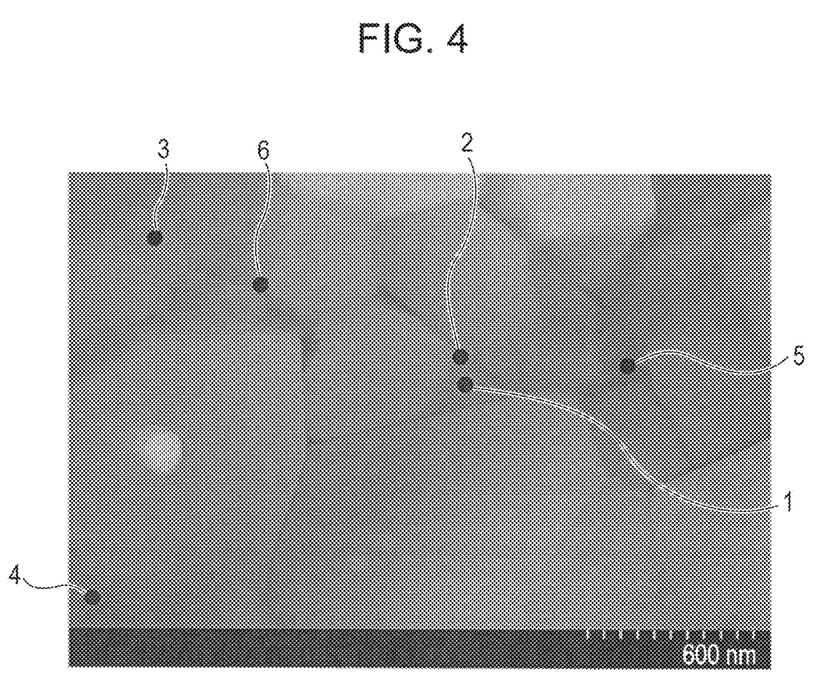
FIG. 4 is a STEM image of the insulator, showing measurement points 1 to 6.
Figure 5A:
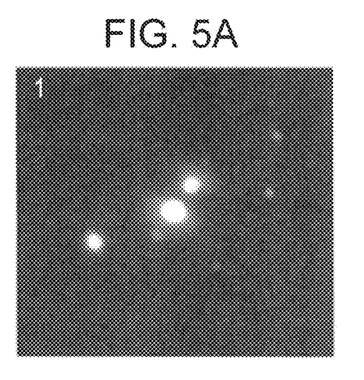
FIG. 5A is an electron diffraction pattern of the measurement point 1.
Figure 5B:
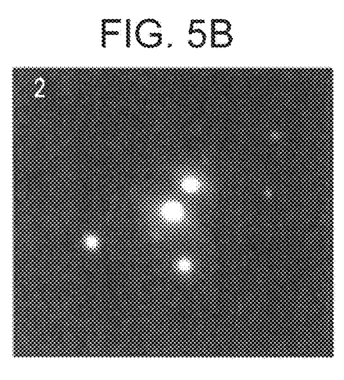
FIG. 5B is an electron diffraction pattern of the measurement point 2.
Figure 5C:
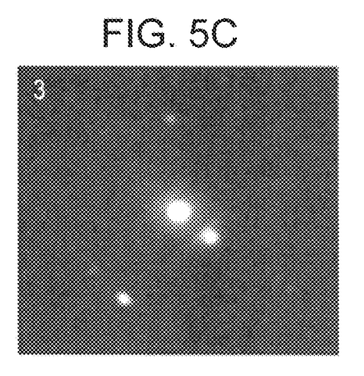
FIG. 5C is an electron diffraction pattern of the measurement point 3.
Figure 5D:
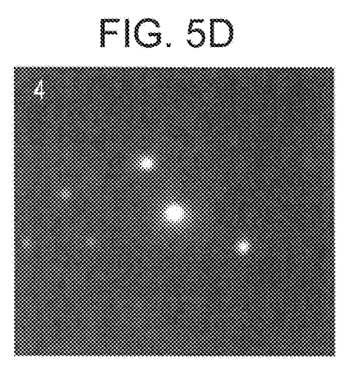
FIG. 5D is an electron diffraction pattern of the measurement point 4.
Figure 5E:
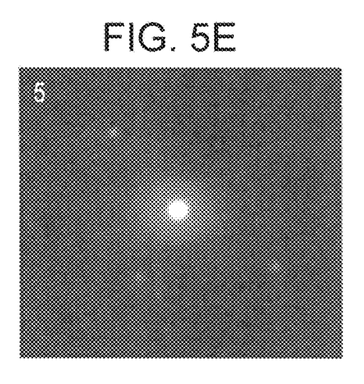
FIG. 5E is an electron diffraction pattern of the measurement point 5.
Figure 5F:
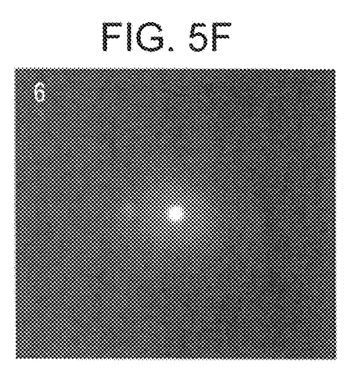
FIG. 5F is an electron diffraction pattern of the measurement point 6.

FIG. 4 is a STEM image of the insulator 11, showing the measurement points 1 to 6. The measurement points 1 to 6 shown in FIG. 4 are all grain-boundary triple points (multi-grain boundaries 23, refer to FIG. 2). FIG. 5A is an electron diffraction pattern of the measurement point 1. FIG. 5B is an electron diffraction pattern of the measurement point 2. FIG. 5C is an electron diffraction pattern of the measurement point 3. FIG. 5D is an electron diffraction pattern of the measurement point 4. FIG. 5E is an electron diffraction pattern of the measurement point 5. FIG. 5F is an electron diffraction pattern of the measurement point 6. FIGS. 3A to 5F show the results of analyzing the insulator 11 at 50,000× magnification with a STEM-EDS under a condition of an electron-probe diameter of 1.0 nm. In FIG. 4, one division of the scale corresponds to 60 nm.

In the insulator 11, Si and a rare earth element are detected at measurement points selected randomly from a portion having a thickness of 15 nm or less at the crystal grain boundaries 21 (refer to FIG. 2) in an analysis of the insulator 11 by using a STEM-EDS at 200,000× magnification under a condition of an electron-probe diameter of 1.0 nm. At the measurement points where Si and the rare earth element are detected, the level of an alkaline earth metal, such as Ba, Mg, Ca, or Sr, is below the detection limit and the alkaline earth metal is not detected. Preparing the insulator 11 such that the alkaline earth metal is not detected at the bi-grain boundaries 22 results in suppression of the embrittlement of the bi-grain boundaries 22 in a high-temperature environment. This improves the dielectric strength of the insulator 11 in a high-temperature environment.

With reference to FIGS. 3C, 3D, and 4, it is confirmed that Ba is present at the measurement points 1 to 4 and La is present at the measurement points 5 and 6. As shown in FIGS. 5A to 5D, the electron diffraction patterns of the measurement points 1 to 4 exhibit diffraction spots, but not broad annular halo patterns. This shows that the measurement points 1 to 4 are crystalized. In the insulator 11, portions where Ba is detected are crystalized, and thus, embrittlement of the portions where Ba is detected, such as the multi-grain boundaries 23, can be suppressed in a high-temperature environment. This improves the dielectric strength of the insulator 11 in a high-temperature environment. Furthermore, the generation of a $SiO_2$—$BaO$—$La_2O_3$ glass phase, which has poor strength, can be suppressed, thereby improving the strength of the insulator 11.

The insulator 11 is preferably prepared such that among ten arbitrary measurement points near the center of the portion where it is confirmed in FIG. 3D that Ba is detected, the electron diffraction pattern of three or more measurement points exhibits a halo pattern. When this condition is satisfied, Ba promotes densification of the alumina-based sintered body, and further, embrittlement of the portions where Ba is present, such as the multi-grain boundaries 23, can be suppressed in a high-temperature environment. This improves the dielectric strength of the insulator 11 in a high-temperature environment.

On the other hand, as shown in FIGS. 5E and 5F, the electron diffraction pattern of the measurement points 5 and 6 where La (rare earth element) is detected exhibits a broad annular halo pattern. This shows that measurement points 5 and 6 are amorphous (glass phase). The insulator 11 is preferably prepared such that among ten arbitrary measurement points in the portion where the rare earth elements are detected, five or more measurement points are amorphous, which is indicated by a halo pattern thereof. In this case, suppression of crystallization of the rare earth components that promote the grain growth of alumina in firing results in suppression of abnormal grain growth of alumina. This ensures the mechanical strength of the insulator 11.

In the X-ray diffraction pattern of the insulator 11, which is specified by diffraction angle and relative intensity, the ratio (I/II) of the diffraction intensity I ($2\theta$: 22.50°) of $BaAl_2Si_2O_8$ to the diffraction intensity II ($2\theta$: 35.74°) of $BaAl_2O_{19}$ is preferably set to 0.5 or more. This increases the ratio of a crystal phase, such as $BaAl_2Si_2O_8$, that contains Ba and Si and that has high adherence to $Al_2O_3$ over that of a crystal phase, such as $BaAl_2O_{19}$, that contains Ba and no Si. This makes the interface between the Ba-based crystal phase and the crystal phase of alumina unlikely to be broken, thereby improving the dielectric strength of the insulator 11.

The insulator 11 is preferably prepared such that the crystal grains 20 (refer to FIG. 2) have an average grain size of 0.3 to 1.0 µm. The average grain size is determined by an intercept method. In the intercept method, a test line (straight line) having a known length is drawn on a polished section of the insulator 11, which includes an axis O. The number of the crystal grains 20 through which the test line passes or that the test line intercepts is counted, and the average grain size is determined by the number. The crystal grains 20 are set to have an average grain size of 0.3 to 1.0 µm, thereby improving the mechanical strength of the insulator 11.

The insulator 11 is preferably prepared such that the surface has an arithmetic average roughness (Ra) of 1 µm or less to make unevenness of the surface unlikely to be an origin of fracture of the insulator. When the insulator 11 is molded by injection molding, the insulator 11 can be prepared to have an Ra in this range. This ensures the mechanical strength of the insulator 11.

The arithmetic average roughness is measured in conformity with JIS B0601: 1994. The arithmetic average roughness Ra is measured by using, for example, a non-contact type 3D Laser Scanning Microscope VK-X110/X100 (manufactured by KEYENCE CORPORATION) or Win-ROOF (manufactured by MITANI Corporation), which is image analysis/measurement software that analyzes images obtained by microscopes, such as a SEM.

The insulator 11 preferably has a relative density of 94% to 99% to ensure dielectric strength characteristics and mechanical strength. The relative density is a value calculated by dividing a density obtained by the experiment (Archimedes' method) by a theoretical density. Elements in an amount of 0.1 wt % or more included in the alumina-based sintered body (insulator 11), other than Al, are quantitatively analyzed by ICP atomic emission spectrometry and ICP mass spectroscopy, and the rest is assumed to be $Al_2O_3$. Then, the theoretical density is calculated.

The ratio of the number of pores having a size of 1 µm or more to that of pores present in an arbitrary mirror-polished section of the insulator 11 is preferably 1% or less to suppress stress concentration at the pores. This improves the dielectric strength characteristics and mechanical strength of the insulator 11 in a high-temperature environment.

Example

With reference to an example, the present invention will be further described in detail; however, the present invention is not limited to the example.

Production of Alumina-Based Sintered Body

An alumina powder having an average particle size of 0.2 to 2.1 µm, a $SiO_2$ powder, and carbonate powders of Ba, Ca, Mg, and La were prepared and mixed in various ratios to provide a variety of material powders. The material powders are each mixed with a polyvinyl alcohol serving as a binder and water serving as a solvent to prepare various slurries.

The obtained slurries were dried by, for example, spray drying to prepare spheroidal granules having an average particle size of about 100 µm. The obtained granules and a thermoplastic resin were kneaded and molded by injection molding to obtain various molded bodies. The molded bodies were each subjected to firing in which the time in a temperature range of 1450° C. to 1650° C. was set to 1 to 8 hours in an air atmosphere to obtain various sintered bodies (including test samples that were in the form of the insulator 11 and that were fired) in Samples 1 to 29. Hereinafter, evaluation methods of the samples (sintered bodies) will be described.

Composition Analysis

The composition of the sintered bodies in the samples 1 to 12, that is, the content of each component was determined by ICP atomic emission spectrometry. The content of each component is calculated as a mass ratio (%) relative to the sum of the determined masses of the components, as expressed in terms of oxides thereof, which was assumed to be 100 wt %.

STEM-EDS

Information about the composition of the sintered bodies in the samples 1 to 23 and 27 to 29 was obtained by using a STEM-EDS (HD-2000, manufactured by Hitachi, Ltd.). The acceleration voltage was set to 200 kV, and the electron-probe diameter was set to 1.0 nm. Elemental analysis, elemental mapping, and electron diffraction were performed at 50,000× magnitude by using an EDS.

In the elemental analysis by using an EDS, a portion having a thickness of 15 nm or less at one of the crystal grain boundaries 21 (refer to FIG. 2) was irradiated with electron beams for 3 minutes to obtain data. The alkaline earth metal in the portion was analyzed by thin-mask approximation. When the concentration ratio calculated from the ratio of intensity of Ba-L line or Ca-K line relative to that of Si-K line is 10.0% or less, the value was determined to be influenced by noises, and thus, the alkaline earth metal was determined not to be present in the portion (less than the detection limit).

Electron diffraction was performed by elemental mapping on ten arbitrary measurement points near the center of the portion where Ba was detected. Electron diffraction was performed on ten arbitrary measurement points of grain-boundary triple points where La was detected. Whether the electron diffraction pattern of each measurement point exhibited a halo pattern or not was investigated.

Average Grain Size

The sections of the sintered bodies (insulator 11) in the samples 1 to 29, which included the axis O (refer to FIG. 1), were mirror-polished and then subjected to heat-etching. Chemical etching may be performed instead of heat etching. The etched sections were observed with a SEM. The acceleration voltage of the SEM was set to 15 kV, and the working distance of the SEM was set to 10 to 12 mm. SEM images of ten fields of view selected randomly were taken. A field of view was a rectangular region having a size of 200 µm×200 µm.

Next, the average grain size was determined by an intercept method. First, crystal grains that crossed at least one of two diagonals of the rectangular region of each of the obtained SEM images were selected. The largest diameter of each of the selected crystal grains was measured and determined to be a longer diameter D1. The largest diameter refers to the largest value of outer diameters of the crystal grain when the outer diameters are measured in all directions. An outer diameter of the crystal grain, which was measured on the straight line that passed through the midpoint of the longer diameter D1 and that was perpendicular to the longer diameter D1, was determined to be a shorter diameter D2. The average value of the longer diameter D1 and the shorter diameter D2 was determined to be the apparent grain size of the crystal grain. The average value of apparent grain sizes of n crystal grains that crossed at least one diagonal was determined to be the average grain size in a field of view. Some difference occurs in each field of view of SEM images. Thus, the average value of grain sizes determined from ten fields of view was determined to be the average grain size.

Dielectric Strength Test

Figure 6:
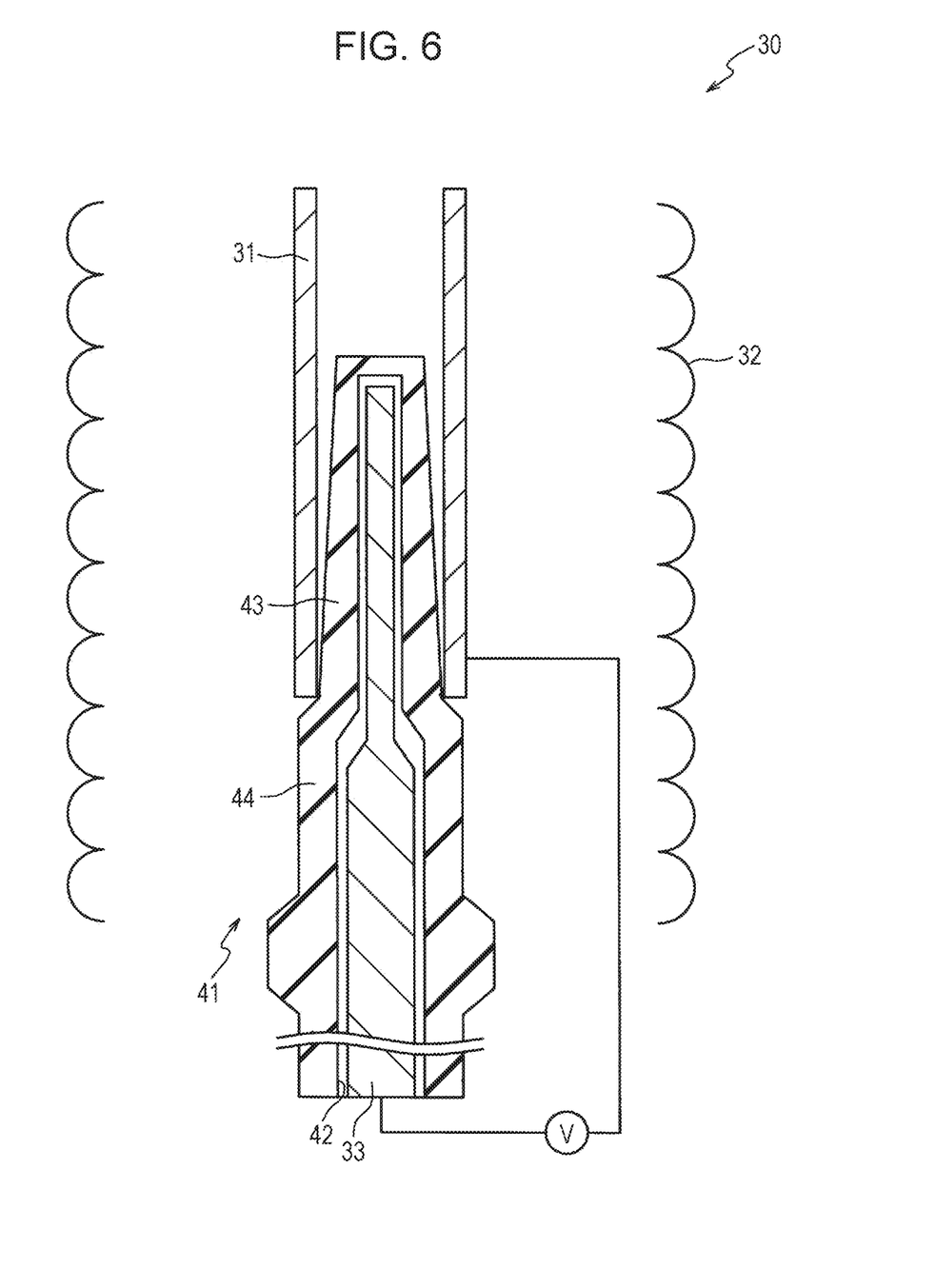
FIG. 6 is a sectional view of a dielectric strength testing apparatus.

A bottomed cylindrical test sample 41 (alumina-based sintered body) in each of the samples 1 to 20 and 24 to 26 was subjected to a high-temperature dielectric-strength test at 800° C. by using a dielectric strength testing apparatus 30 illustrated in FIG. 6. FIG. 6 is a sectional view of the dielectric strength testing apparatus 30.

As illustrated in FIG. 6, the test sample 41 has an axial hole 42 in the center in an axis direction. The axial hole 42 has a closed end. The test sample 41 includes a cylindrical small-diameter portion 43, in which the opening portion at the end of the axial hole 42 is closed, and a cylindrical large-diameter portion 44, which has a larger diameter than the small-diameter portion 43. The small-diameter portion 43 and the large-diameter portion 44 are connected to each other in the axis direction. The dielectric strength testing apparatus 30 includes a metal annular member 31, a heater 32 that heats the annular member 31, and a rod-like electrode 33. High voltage is applied between the rod-like electrode 33 and the annular member 31. The electrode 33 is made of Ni alloy.

The electrode 33 was inserted from the opening of the axial hole 42 of the test sample 41 to the end of the axial hole 42. In the state of disposing the annular member 31 such that the inner surface of the annular member 31 was in contact with the outer surface of the test sample 41, the outer surface being near the boundary between the small-diameter portion 43 and the large-diameter portion 44, the dielectric strength of the test sample 41 was measured.

Specifically, in the state in which the periphery of the test sample 41 was heated to 800° C. with the heater 32, a voltage was applied between the annular member 31 and the electrode 33. The voltage was increased at a rate of 1.5 kV/s, and the voltage was measured when electric breakdown occurred in the test sample 41, in other words, when the test sample 41 was punctured and the voltage was unable to be increased.

The test sample 41 in which electric breakdown occurred was taken out of the dielectric strength testing apparatus 30, and the thickness from the peripheral surface of a portion in which the electric breakdown occurred and that is punctured to the axial hole 42 was measured. The value (kV/mm) obtained by dividing the voltage applied when the electric breakdown occurred by the thickness was determined to be dielectric strength.

Bending Strength

Three-point bending strength was measured at a room temperature (5° C. to 35° C.) in conformity with JIS R1601: 2008.

Arithmetic Average Roughness

For the sintered bodies (insulator 11) in the samples 21 to 23, the arithmetic average roughness of the front-end portion of the insulator 11 in the direction of the axis O was measured with a 3D Laser Scanning Microscope VK-X110/X100 (manufactured by KEYENCE CORPORATION).

Bending Test

For the sintered bodies (insulator 11) in the samples 21 to 23, load was applied in a direction perpendicular to the axis O to the front-end portion of the insulator 11 (refer to FIG. 1) from three different directions in a circumferential direction by using a material testing device, and the load applied when breakdown of the insulator 11 occurred (mechanical failing load) was measured.

X-Ray Diffraction

After the sintered bodies in the samples 24 to 26 were subjected to polishing treatment, X-ray diffraction analysis was performed with an X-ray diffraction apparatus (model: Smart Lab) manufactured by Rigaku Corporation under measuring conditions of X ray: CuK$\alpha$ ($\lambda$ 1.54 Å), X ray output: 40 kV-30 mA, scan speed (counting time): 20.0, sampling width: 0.02 deg, entrance slit: ½ deg, receiving slit (1): 15.000 mm, and receiving slit (2): 20.000 mm.

The ratio (I/II) of the diffraction intensity I of $BaAl_2Si_2O_8$ (2$\theta$: 22.50°) to the diffraction intensity II (2$\theta$: 35.74°) of $BaAl_2O_{19}$ was calculated from the obtained X-ray diffraction pattern. The diffraction intensities of peaks in the X-ray diffraction pattern were determined by processing the data with data analysis software "Peak Search" manufactured by Rigaku Corporation under conditions of smoothing: weighted average (11 smoothing points) and background removal (peak width threshold 0.10 and intensity threshold 0.01).

In the samples 1 to 29, the relative density of the sintered body was 94% to 99%, and the ratio of the number of pores having a size of 1 µm or more to that of pores present in an arbitrary mirror-polished section of the sintered body was below 1%. In the sintered bodies in the samples 1 to 29, the content of the Na component was 100 to 2,000 ppm, as expressed in terms of an oxide ($Na_2O$).

Table 1 shows compositions of the samples 1 to 12, elements detected at a crystal grain boundary having a thickness of 15 nm or less, average grain size, and the measurements of dielectric strength and bending strength at 800° C.

where Ba was detected, average grain size, and the measurements of dielectric strength and bending strength at 800° C. in the samples 13 to 20.

TABLE 1

| | Composition (wt %) | | | | | | Element detected at grain boundary | Average grain size (μm) | Dielectric strength (kV/mm) | Bending strength (MPa) |
|---|---|---|---|---|---|---|---|---|---|---|
| No | $Al_2O_3$ | $SiO_2$ | MgO | CaO | BaO | $La_2O_3$ | | | | |
| 1 | 94 | 3.0 | 0.5 | 0 | 2.0 | 0.50 | Si, La | 0.5 | 230 | 720 |
| 2 | 90 | 3.5 | 1.0 | 0 | 0.5 | 5.00 | Si, La | 0.5 | 215 | 641 |
| 3 | 94 | 3.8 | 0.5 | 0 | 1.6 | 0.11 | Si, La | 0.5 | 210 | 702 |
| 4 | 91 | 5.0 | 0.3 | 0 | 2.8 | 0.90 | Si, La | 0.5 | 210 | 680 |
| 5 | 91 | 1.7 | 0.3 | 0 | 6.0 | 1.00 | Si, La | 0.5 | 210 | 712 |
| 6 | 94 | 3.0 | 0.5 | 0.3 | 1.7 | 0.50 | Si, La | 0.5 | 216 | 672 |
| 7 | 94 | 2.7 | 0.5 | 0 | 2.3 | 0.50 | Si, La | 0.5 | 230 | 720 |
| 8 | 93 | 3.0 | 0.5 | 2.0 | 1.0 | 0.50 | Si, La | 0.5 | 200 | 643 |
| 9 | 94 | 3.0 | 0.5 | 0 | 1.0 | 1.50 | Si, La | 0.5 | 192 | 660 |
| 10 | 98 | 1.0 | 0.4 | 0 | 0.3 | 0.30 | Si, La | 0.5 | 200 | 605 |
| 11 | 94 | 3.0 | 0.5 | 0 | 2.0 | 0.50 | Si, La, Ba | 0.5 | 130 | 688 |
| 12 | 92 | 3.0 | 0.5 | 3.0 | 1.0 | 0.50 | Si, La, Ca | 0.5 | 126 | 669 |

Si and La were detected at a crystal grain boundary in the samples 1 to 10, whereas Ba or Ca in addition to Si and La was detected at crystal grain boundaries in the samples 11 and 12. It has been found that the dielectric strength of the samples 1 to 10 is significantly higher than the dielectric strength of the samples 11 and 12, in which Ba or Ca was detected at crystal grain boundaries. It is assumed that embrittlement of the crystal grain boundaries in a high-temperature environment was suppressed in the samples 1 to 10, and thus, the dielectric strength in a high-temperature environment was improved more than that of the samples 11 and 12.

It is assumed that Ca was detected at a crystal grain boundary in the sample 12 because the content of the Ca component was higher than 2 wt %. It is assumed that Ba was detected at a crystal grain boundary in the sample 11 because firing time was longer than that of other samples.

It has been found that the samples 2 and 10 having a content of the Ba component of less than 1 wt % have a lower bending strength than other samples. The samples 2 and 10 have a low content of the Ba component, and thus, a crystal phase containing Si, such as $BaAl_2Si_2O_8$, was unlikely to be formed. Therefore, it is assumed that an effect of suppressing formation of a glass phase containing Si was reduced, and thus, the strength of the crystal grain boundary was reduced.

It has been found that the sample 8 having a content of the Ca component of higher than 0.3 wt % has a lower bending strength than the samples 1, 3 to 7, and 9. It is assumed that in the sample 8, a glass phase having a less strength was formed at a crystal grain boundary due to the Ca component, and thus, the strength was decreased.

It has been found that the samples 5 and 7 having a content of the Si component of 2.7 wt % or less have a bending strength of 710 MPa or more. The samples 5 and 7 have a low content of the Si component. Therefore, it is assumed that the generation of a glass phase having a low strength was suppressed, and thus, the strength was improved.

Table 2 shows elements detected at a crystal grain boundary having a thickness of 15 nm or less, the number of halo patterns exhibited in electron diffraction patterns of ten arbitrary measurement points near the center of the portion

TABLE 2

| No | Element detected at grain boundary | Number of halo patterns | Average grain size (μm) | Dielectric strength (kV/mm) | Bending strength (MPa) |
|---|---|---|---|---|---|
| 13 | Si, La | 0 | 0.6 | 230 | 710 |
| 14 | Si, La | 0 | 1.0 | 210 | 630 |
| 15 | Si, La | 0 | 0.3 | 210 | 720 |
| 16 | Si, La | 0 | 0.2 | 210 | 450 |
| 17 | Si, La | 0 | 1.5 | 210 | 500 |
| 18 | Si, La, Ba | 0 | 0.6 | 180 | 620 |
| 19 | Si, La | 3 | 0.6 | 160 | 620 |
| 20 | Si, La | 5 | 0.6 | 150 | 600 |

In the samples 19 and 20, among ten arbitrary measurement points in a portion where Ba was detected, halo patterns were exhibited at three or five measurement points. This shows that crystallization of the portion where Ba was detected was not promoted compared with that in the samples 1 to 18. It has been found that the samples 19 and 20 have a lower dielectric strength than the samples 1 to 18. Furthermore, it has been found that the sample 20, in which five halo patterns was exhibited, has a lower dielectric strength than the sample 19, in which three halo patterns were exhibited. Therefore, it is assumed that promoting crystallization of the portion where Ba is detected (mainly, multi-grain boundaries 23) and suppressing embrittlement of, for example, the multi-grain boundaries 23 (refer to FIG. 2) in a high-temperature environment are effective to improve dielectric strength in a high-temperature environment.

Si and La were detected at grain boundaries (mainly, bi-grain boundaries 22) in the samples 13 and 17, whereas Ba in addition to Si and La was detected at grain boundaries in the sample 18. It has been found that the dielectric strength of the samples 13 to 17 is higher than the dielectric strength of the sample 18. It is assumed that in the samples 13 to 17, embrittlement of the bi-grain boundaries 22 (refer to FIG. 2) in a high-temperature environment was suppressed, and thus, the dielectric strength in a high-temperature environment was improved more than that of the sample 18. Therefore, it has been found that, what is effective to improve dielectric strength in a high-temperature environment is that grain boundaries having a thickness of 15 nm or less contain Si and La (rare earth element) and that an electron diffraction pattern of a portion where Ba is detected exhibits a diffraction spot, like the samples 13 to 17.

The sample 16 has an average grain size of less than 0.3 μm. The sample 17 has an average grain size of more than 1.0 μm. It has been found that the samples 13 to 15 having an average grain size of 0.3 to 1.0 μm have a greater bending strength than the samples 16 and 17. It is assumed that the sample 16 had a lower strength because grain growth was insufficient in firing and that the sample 17 had a lower strength because coarse particles were present.

Table 3 shows elements detected at a grain boundary having a thickness of 15 nm or less, the number of halo patterns exhibited in electron diffraction patterns of ten arbitrary measurement points near the center of the portion where Ba was detected, average grain size, arithmetic average roughness of the front-end portion of the insulator 11, and the measurement of mechanical failing load in a bending test in the samples 21 to 23.

TABLE 3

| No | Element detected at grain boundary | Number of halo patterns | Average grain size (μm) | Arithmetic average roughness (μm) | Bending test (N) |
|---|---|---|---|---|---|
| 21 | Si, La | 0 | 0.6 | 1.0 | 1000 |
| 22 | Si, La | 0 | 0.6 | 0.5 | 1000 |
| 23 | Si, La | 0 | 0.6 | 3.0 | 400 |

The sample 23 has an arithmetic average roughness of more than 1.0 μm. It has been found that the samples 21 and 22 having an arithmetic average roughness of 1.0 μm or less has a greater mechanical failing load in the bending test than the sample 23. It is assumed that in the sample 23, breakdown started from unevenness of the surface of the front-end portion of the insulator 11, and thus, the mechanical failing load was decreased.

Table 4 shows elements detected at a grain boundary having a thickness of 15 nm or less, the ratio (I/II) of the diffraction intensity I of $BaAl_2Si_2O_8$ (2θ: 22.50°) to the diffraction intensity II of $BaAl_2O_{19}$ (2θ:35.74°), the diffraction intensity being calculated from the X-ray diffraction pattern, the average grain size, and the measurement of the dielectric strength at 800° C. in the samples 24 to 26.

TABLE 4

| No | Element detected at grain boundary | I/II | Average grain size (μm) | Dielectric strength (kV/mm) |
|---|---|---|---|---|
| 24 | Si, La | 0.5 | 0.6 | 210 |
| 25 | Si, La | 2.0 | 0.6 | 230 |
| 26 | Si, La | 0.3 | 0.6 | 200 |

The sample 26 has a ratio I/II of less than 0.5. It has been found that the samples 24 and 25 having a ratio I/II of 0.5 or more have a greater dielectric strength than the sample 26. The sample 26 has a greater amount of $BaAl_2O_{19}$ than the samples 24 and 25. It is assumed that the adhesive strength of the interface between the crystal phase of $Al_2O_3$ and the crystal phase of $BaAl_2O_{19}$ was smaller than the adhesive strength of the interface between the crystal phase of $Al_2O_3$ and the crystal phase of $BaAl_2Si_2O_8$, and thus, electric breakdown occurred at the interface between the crystal phase of $Al_2O_3$ and the crystal phase of $BaAl_2O_{19}$ in the sample 26.

Table 5 shows elements detected at a crystal grain boundary having a thickness of 15 nm or less, the number of halo patterns exhibited in electron diffraction patterns of ten arbitrary measurement points in the portion where La was detected, the average grain size, and the measurement of bending strength in the samples 27 to 29.

TABLE 5

| No | Element detected at grain boundary | Number of halo patterns | Average grain size (μm) | Bending strength (MPa) |
|---|---|---|---|---|
| 27 | Si, La | 10 | 0.6 | 700 |
| 28 | Si, La | 5 | 0.6 | 650 |
| 29 | Si, La | 0 | 0.6 | 600 |

The sample 27 had 10 halo patterns in electron diffraction patterns of ten arbitrary measurement points of grain-boundary triple points where La was detected. The sample 29 had ten measurement points where the electron diffraction pattern exhibited diffraction spots but not a halo pattern among ten arbitrary measurement points in a portion where La was detected. This shows that crystallization of the portion where La was detected was not promoted in the sample 27 compared with that in the sample 29. The degree of the crystallization in the sample 28 was between those in the samples 27 and 29.

It has been found that the samples 27, 28, and 29 have the same average grain size; however, the bending strength increases in the order of the sample 29, 28, and 27. It is assumed that crystallization of the rare earth components that promote grain growth of alumina in sintering was more suppressed in the order of the sample 29, 28, and 27, and thus, the strength of the samples was improved in this order.

In this example, the case in which La was mixed as a rare earth element was described. When another rare earth element, such as Y, Pr, Nd, or Yb was mixed, the same result is obtained.

The present invention has been described based on the embodiment, and the present invention is not limited to the above-described embodiment. It is easily assumed that various improvements and modification are possible within the spirit of the present invention.

In the embodiment, the spark plug 10 in which spark discharge is generated between the ground electrode 16 connected to the metal shell 15 and the center electrode 13 has been described, and the present invention is not limited to the spark plug. The alumina-based sintered body described in the embodiment is possibly be used as an insulator in other spark plugs as a matter of course. Examples of other spark plugs include spark plugs in which barrier discharge is generated around an insulator including the center electrode 13 and spark plugs in which corona discharge is generated at the end of a center electrode penetrating an insulator.

Having described the invention, the following is claimed:
1. A spark plug, comprising:
    an insulator formed of an alumina-based sintered body, the insulator containing Si, one or more alkaline earth metals, and a rare earth element,
    wherein the alkaline earth metals include Ba,
    wherein, in analyzing the insulator by using a scanning transmission electron microscope having an electron-probe diameter of 1 nm:
        Si and the rare earth element are detected at a crystal grain boundary having a thickness of 15 nm or less; and an amount of the alkaline earth metals at the crystal grain boundary is less than an amount of the alkaline earth metals that is detectable, and wherein a diffraction spot is present in an electron diffraction pattern of a portion where Ba is detected.

2. The spark plug according to claim 1, wherein the insulator has an average grain size of 0.3 to 1.0 μm.

3. The spark plug according to claim 1, wherein, the insulator has a ratio (I/II) of a peak intensity (I) of $BaAl_2Si_2O_8$ to a peak intensity (II) of $BaAl_2O_{19}$ of 0.5 or more in an X-ray diffraction pattern specified by diffraction angle and relative intensity.

4. The spark plug according to claim 1, wherein the insulator has a surface having an arithmetic average roughness of 1 μm or less.

5. The spark plug according to claim 2, wherein, the insulator has a ratio (I/II) of a peak intensity (I) of $BaAl_2Si_2O_8$ to a peak intensity (II) of $BaAl_2O_{19}$ of 0.5 or more in an X-ray diffraction pattern specified by diffraction angle and relative intensity.

6. The spark plug according to claim 2, wherein the insulator as a surface having an arithmetic average roughness of 1 μm or less.

7. The spark plug according to claim 3, wherein the insulator has a surface having an arithmetic average roughness of 1 μm or less.

8. The spark plug according to claim 1, wherein; in analyzing the insulator by using the scanning transmission electron microscope having the electron-probe diameter of 1 nm, a concentration ratio calculated from a ratio of intensity of Ba-L line or Ca-K line relative to that of Si-K line is less than or equal to 10% at the crystal grain boundary.

* * * * *